(12) United States Patent
DeLoach, Jr.

(10) Patent No.: US 9,149,133 B1
(45) Date of Patent: Oct. 6, 2015

(54) METHODS FOR USING BALL MOUNT ASSEMBLIES WITH INELASTIC BANDS

(71) Applicant: Thomas W. DeLoach, Jr., New Hill, NC (US)

(72) Inventor: Thomas W. DeLoach, Jr., New Hill, NC (US)

( * ) Notice: Subject to any disclaimer, the term of this patent is extended or adjusted under 35 U.S.C. 154(b) by 0 days.

(21) Appl. No.: 14/464,678

(22) Filed: Aug. 20, 2014

Related U.S. Application Data

(60) Provisional application No. 61/867,988, filed on Aug. 20, 2013, provisional application No. 61/868,029, filed on Aug. 20, 2013.

(51) Int. Cl.
| | | |
|---|---|---|
| A47F 7/00 | (2006.01) | |
| A47G 29/02 | (2006.01) | |
| F16M 13/02 | (2006.01) | |
| A63B 71/00 | (2006.01) | |

(52) U.S. Cl.
CPC . *A47F 7/00* (2013.01); *A47G 29/02* (2013.01); *A63B 71/0036* (2013.01); *F16M 13/02* (2013.01)

(58) Field of Classification Search
CPC ........ A47F 7/00; B44C 5/0461; A47G 29/02; A63B 71/0036; Y10T 29/54
See application file for complete search history.

(56) References Cited

U.S. PATENT DOCUMENTS

| | | | | |
|---|---|---|---|---|
| 2,551,354 | A * | 5/1951 | Wasilevich | ................ 206/315.9 |
| 6,199,804 | B1 * | 3/2001 | Donofrio, Jr. | ................ 248/121 |
| 6,601,711 | B1 | 8/2003 | Knable, III | |
| 7,500,570 | B2 | 3/2009 | Kurcheski | |
| 8,627,952 | B2 | 1/2014 | Glinert | |

OTHER PUBLICATIONS

Ball & Helmet Holders home page as found on Archive.org on Apr. 21, 2015. Archive.org asserts that this material was collected Aug. 28, 2008. Archive.org web page is found at https://web.archive.org/web/20080828034848/http://www.ballandhelmetholder.com/page.home. Printed onto four pages.

Perfect Cases web page as found on Archive.org on Apr. 21, 2015. Archive.org asserts that this material was collected on Mar. 13, 2013. Archive.org web page is found at https://web.archive.org/web/20130313140822/http://www.perfectcases.com/. Printed on one page in portrait and repeated enlarged on landscape to allow inspection of the ball holders.

* cited by examiner

*Primary Examiner* — Moshe Wilensky
(74) *Attorney, Agent, or Firm* — Kevin E. Flynn; Flynn IP Law

(57) ABSTRACT

Wall mount assemblies with partially elastic augmentation bands or inelastic bands. The augmentation bands and inelastic bands interact with seams running from one pole to another pole on a ball. The ball may be a football, basketball, or other type of ball. A football may be further connected to the wall mount assembly via a lace engagement component that engages the laces on the football. The various wall mount assemblies provide an illusion that the ball is floating near the flat surface without support. A wall mount component connected to the flat surface by a set of fasteners is out of the line-of-sight of an observer as the wall mount component is behind the ball and the connection between the ball and the wall mount component is designed to be difficult to see.

16 Claims, 16 Drawing Sheets

550

METHODS FOR USING BALL MOUNT ASSEMBLIES WITH INELASTIC BANDS

This application claims the benefit of U.S. Provisional Application No. 61/867,988 filed Aug. 20, 2013 for Football Wall Assembly with Augmentation Band and U.S. Provisional Application No. 61/868,029 filed Aug. 20, 2013 for Wall Mount Assembly. Both provisional applications are incorporated by reference.

BACKGROUND

Field of the Disclosure

This disclosure relates generally to assemblies that allow for the mounting for display of a ball such as a football or basketball to a flat surface. The flat surface may be a vertical wall, a slanted wall, or a ceiling. The football may be mounted with the longitudinal axis horizontal or non-horizontal.

American football is one of several sports that uses a ball that is best described as a prolate spheroid which may defined as a spheroid with a polar axis (distance between the two tips of the ball) is greater than the equatorial diameter (diameter midway between the two tips). Sports that use a prolate spheroid shaped ball including American Football, Arena Football, Canadian Football, Rugby, and Australian Rules Football, among others. These balls are distinct from the ball known as a soccer ball in the United States which is a truncated icosahedron and not a prolate spheroid. While footballs used at the highest level of play and for commemorative purposes are made of a leather type material with separate lace material, there are also footballs made of a polymer (often called rubber) that are cast with the laces being protrusions in the cast surface rather than one or more components distinct from the leather panels.

FIG. 1 shows an American football such as the type used in the National Football League. The football 100 has a first pole 104 and a second pole 108. The football has four football panels 116 that are separated by seams 112. The football 100 has a set of laces 150 that are gripped by the person throwing the football 100. The set of laces 150 has one or more longitudinal laces 154 which straddle the equator of the football. The equator 120 on the football would be the latitude that is halfway between the first poles 104 and second pole 108. A set of latitudinal laces 158 cross the longitudinal laces 154 at the ends and at several places along the longitudinal laces 154. The latitudinal laces 158 are substantially orthogonal with the longitudinal laces 154.

To provide context for this disclosure, it is useful to give an approximate size and weight for a football. According to the NFL Rule 2, section 1, the ball must be from a specified supplier and bear the signature of the commissioner of the NFL, but more relevant to this application the football must be an inflated 12½ to 13½ pound urethane bladder enclosed in a pebble grained, leather case (natural tan color) without corrugations of any kind. It shall have the form of a prolate spheroid and the size and weight shall be:

long axis: 11 to 11¼ inches;
long circumference: 28 to 28½ inches;
short circumference: 21 to 21¼ inches.
weight: 14 to 15 ounces.

Regulation sized footballs used in an NCAA-regulated college football game are roughly:

long axis: 10½ to 11½ inches;
long circumference: approximately 28 inches; and
short circumference: approximately 21 inches.

The average is approximately 11.5 inches long by 6.7 inches in diameter. An NCAA football differs from the NFL ball in that it has two 1-inch white stripes that are three to three and one-quarter inches from either end of the ball and located only on the two panels adjacent to the laces. It can be up to one-half inch shorter along the long axis, but only slightly narrower than NFL balls.

There may be special commemorative balls that are of a different size, or balls intended for younger players that are smaller than the NCAA or NFL footballs. Footballs used in other types of football may have different aspect ratios (length to diameter).

There are a number of reasons why a person may wish to display a football rather than to simply store it with other outside gear. The football may have been the specific football used in an event of some significance such as a ball that was the $200^{th}$ catch by a particular receiver, or the game ball awarded to a star player in a college game.

Frequently, the football is not in compliance with all the rules to be a game ball but is instead a commemorative football. Many of these commemorative balls are regulation size but are provided with coloring, text, or emblems not found on a regulation ball. There are many different types of commemorative footballs. The football may be a special commemorative ball noting a special event such as a bowl game appearance. The football may have special coloring or other markings that notes that it is a football associated with a particular college (NCAA) or professional (NFL) team.

The football (commemorative or regulation ball) may be signed by a player or football coach and thus have significance much like any other autograph from a famous person.

SUMMARY OF THE DISCLOSURE

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provide below as one of skill in the art will recognize that inventive concepts illustrated in various examples can be combined together in order to address a specific application.

Other systems, methods, features and advantages of the disclosed teachings will be or will become apparent to one with skill in the art upon examination of the following figures and detailed description. It is intended that all such additional systems, methods, features and advantages be included within the scope of and be protected by the accompanying claims.

There are many aspects of the present disclosure, too many to list in detail here. However, one set of teachings of the present disclosure relate to the use of an augmentation band to augment the interaction of the lace engagement component with the laces of the football to allow for an enhanced connection between the wall mount component and the football. This enhanced connection may be used to mount the football on a sloped wall or a ceiling. The enhanced connection may be used to mount a football with one pole of the football far out of horizontal alignment with the other pole of the football.

Another set of teachings of the present disclosure relate to the use of an inelastic band that is placed around a fully or partially deflated ball which when inflated or re-inflated fits snugly within the inelastic band to bind the ball to a wall mount component. The ball may be a basketball and one or more inelastic bands may be used. The ball may be a football and the one or more inelastic bands may be used. A football may use a combination of a lace engagement component with one or more inelastic bands. Kits may be provided which provide options in the manner of display, the size of the balls displayed, and possibly the color of the particular band or bands to be used, including colors such as clear, black or other seam color, ball color, and possibly a team color.

BRIEF DESCRIPTION OF THE FIGURES

The disclosure can be better understood with reference to the following figures. The components in the figures are not necessarily to scale, emphasis instead being placed upon illustrating the principles of the disclosure. Moreover, in the figures, like reference numerals designate corresponding parts throughout the different views.

DETAILED DESCRIPTION

FOOTBALL WITHOUT AUGMENTATION BAND.

Introduction to Components.

Figure 1:
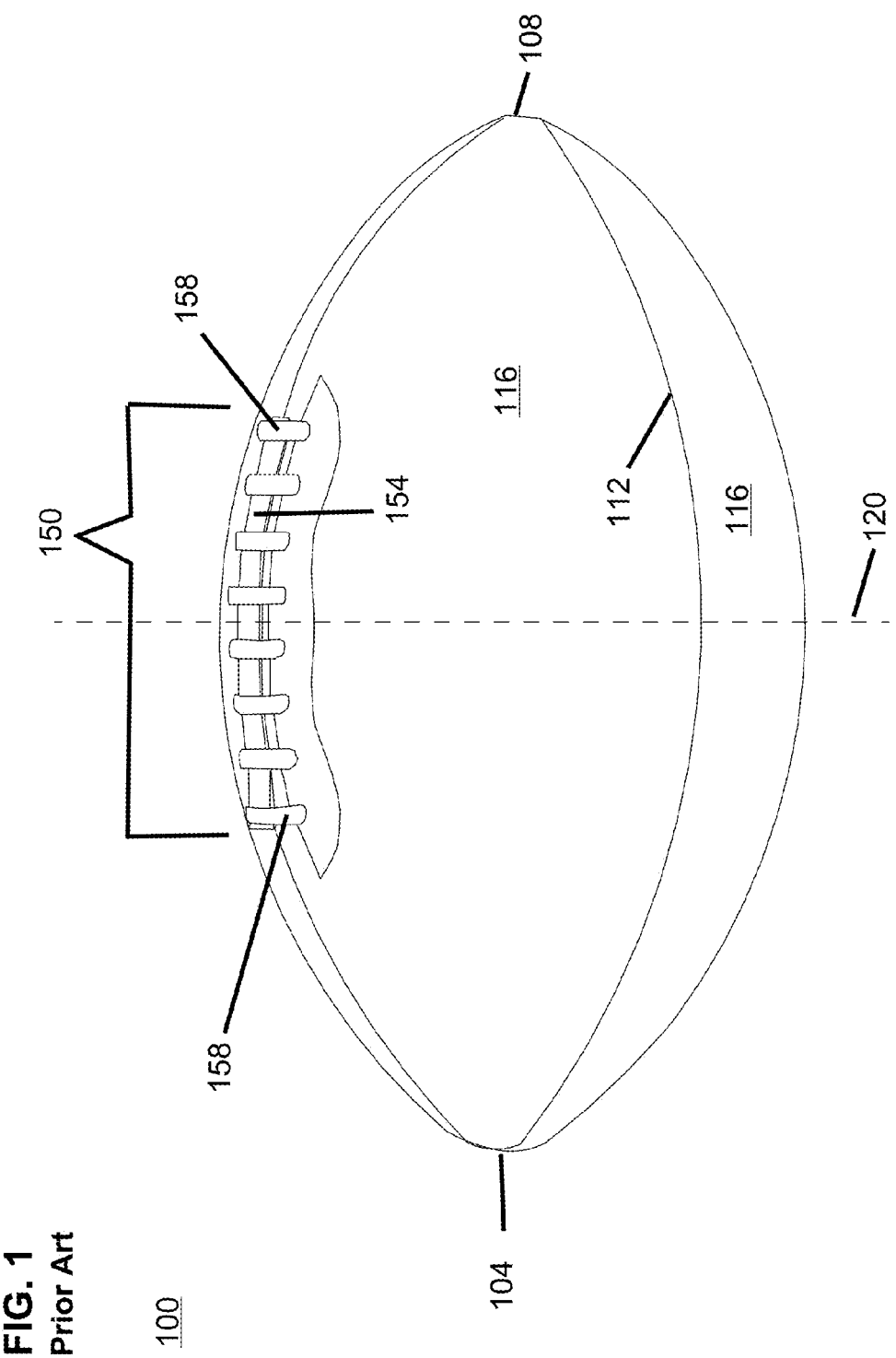
FIG. 1 shows an American football such as the type used in the National Football League.
Figure 2:
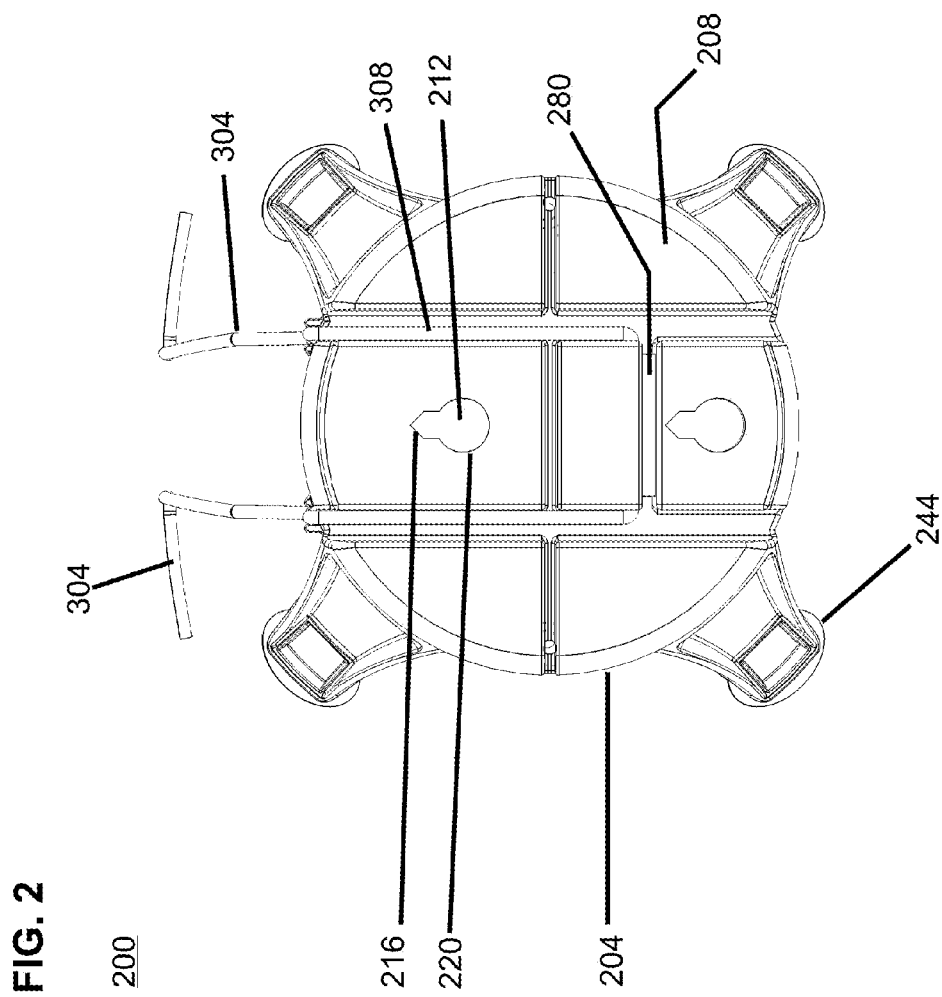
FIG. 2 shows a rear perspective view of a wall mount assembly 200 with a wall mount component 204 and a lace engagement component 304.

FIG. 2 shows a rear perspective view of a wall mount assembly 200 with a wall mount component 204 and a lace engagement component 304. The wall mount component 204 has a wall-facing side 208 to allow the wall mount component 204 to be placed flush against the wall. The wall mount component 204 may have one or more fastener engaging slots 212 that allow the wall mount component 204 and a football engaged with the lace engagement component 304 to fit over the head of a fastener (such as a screw head).

Frequently the smaller portion 216 of the one or more fastener engaging slots 212 is placed directly above the larger portion 220 of the fastener engaging slots 212, but the orientation of the smaller portion 216 to the larger portion 220 may deviate plus or minus a small amount degrees from purely vertical alignment. Given the engagement of the lace engagement component 304 with the wall mount component 204, the angle of the longitudinal centerline which runs internal to the football from the first pole 104 to the second pole 108 will be substantially orthogonal with the axis of the smaller portion 216 to larger portion 220.

The wall mount component 204 has a ball-facing side 240 (better seen in other figures) that is on the opposite side of the wall mount component 204 relative to the wall-facing side 208. The ball-facing side 240 may be in a variety of configurations but is preferably adapted to nestle the curved surface of the football near the equator 120 of the football 100.

One configuration for the ball-facing side 240 is to have a set of fingers 244 extend outwards. While four fingers 244 are shown in FIG. 2, different numbers of fingers could be used. Using two fingers may be adequate, but most configurations are going to use three or more fingers for stability. The fingers may have finger tips that are partial hemi-spheres. Appropriate choices for the geometry of the ball-facing side 240 may allow for footballs from more than one regulation size to be used with a particular wall mount assembly. For example, a football mount may be used with either an NFL regulation sized football or an NCAA regulation sized football. Other mount assemblies adapted for other types of footballs such as balls used in Rugby or reduced sized commemorative balls may have different geometries as it is not essential that any one mount assembly must accommodate all possible prolate spheroid balls.

Figure 3:
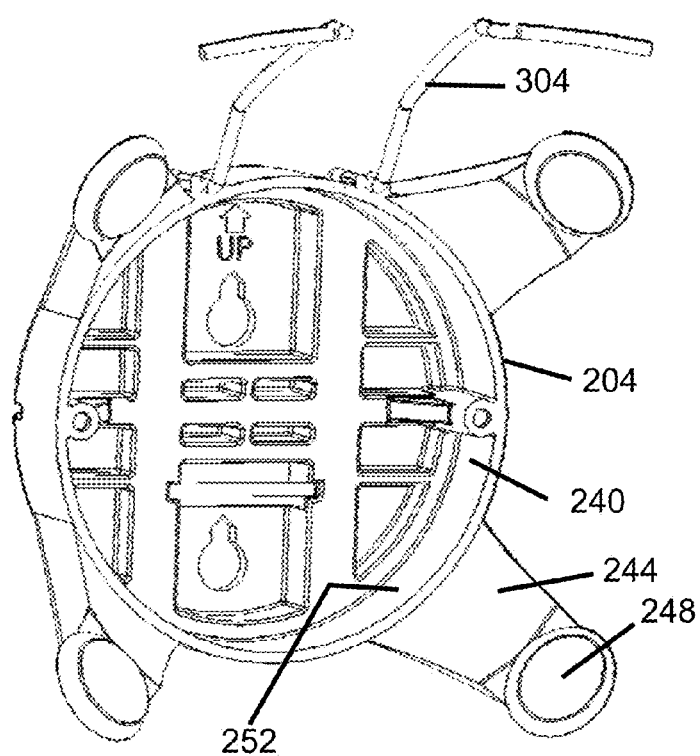
FIG. 3 shows a front perspective view of the wall mount component 204 and the lace engagement component 304.

FIG. 3 shows a front perspective view of the wall mount component 204 and the lace engagement component 304. The ball-facing side 240 with four fingers 244, and four finger tips 248 are visible. A cavity 252 within the ball-facing side 240 may be covered with a cavity cover (not shown here). The cavity may be used to store a set of batteries and electronics for use in providing sound or LED illumination to add another aspect to the display.

One of skill in the art will recognize that the activation of a light may be done by a switch or via alternatives such as sound activation, wireless controller, light sensor (so a flashlight beam toggles the light on and off) or other activation tools known in the art. Deactivation could be achieved in the same manner as activation. For a process that plays a college fight sound or some other sound upon activation, deactivation may not be necessary as the sound may automatically terminate after the end of a set duration.

A printed circuit board with some or all of the relevant electronics could serve as the cavity cover. This printed circuit board may extend beyond the perimeter of the cavity wall.

Figure 4:
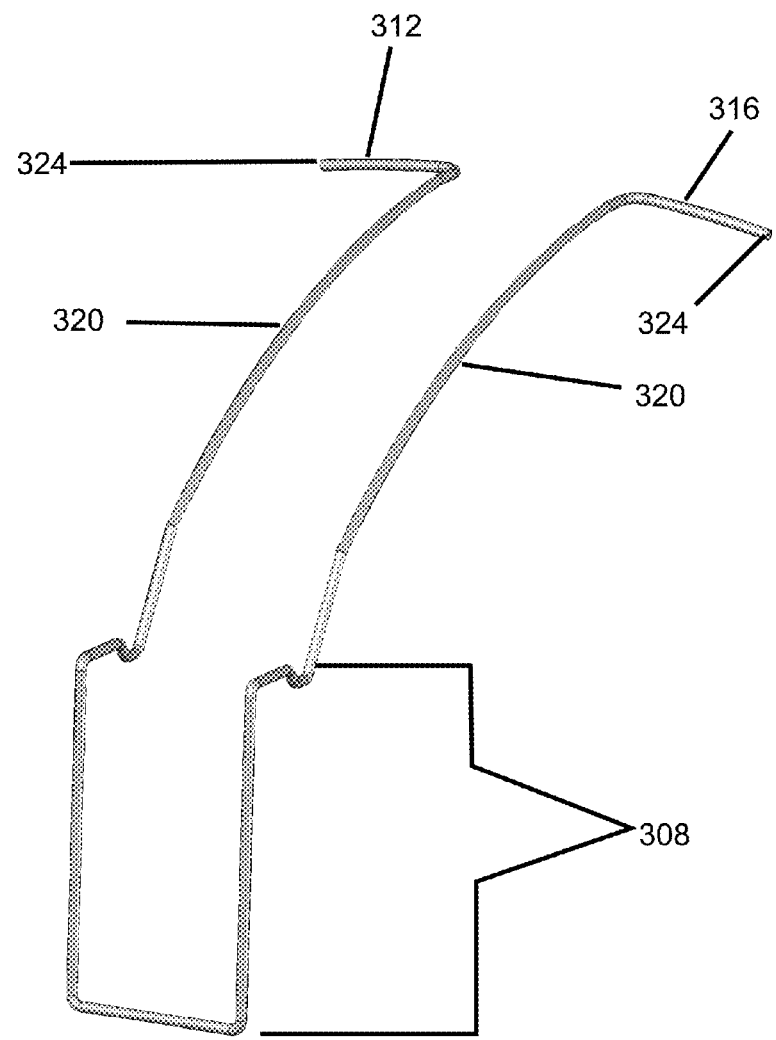
FIG. 4 is a rear side perspective view of lace engagement component 304.
Figure 5:
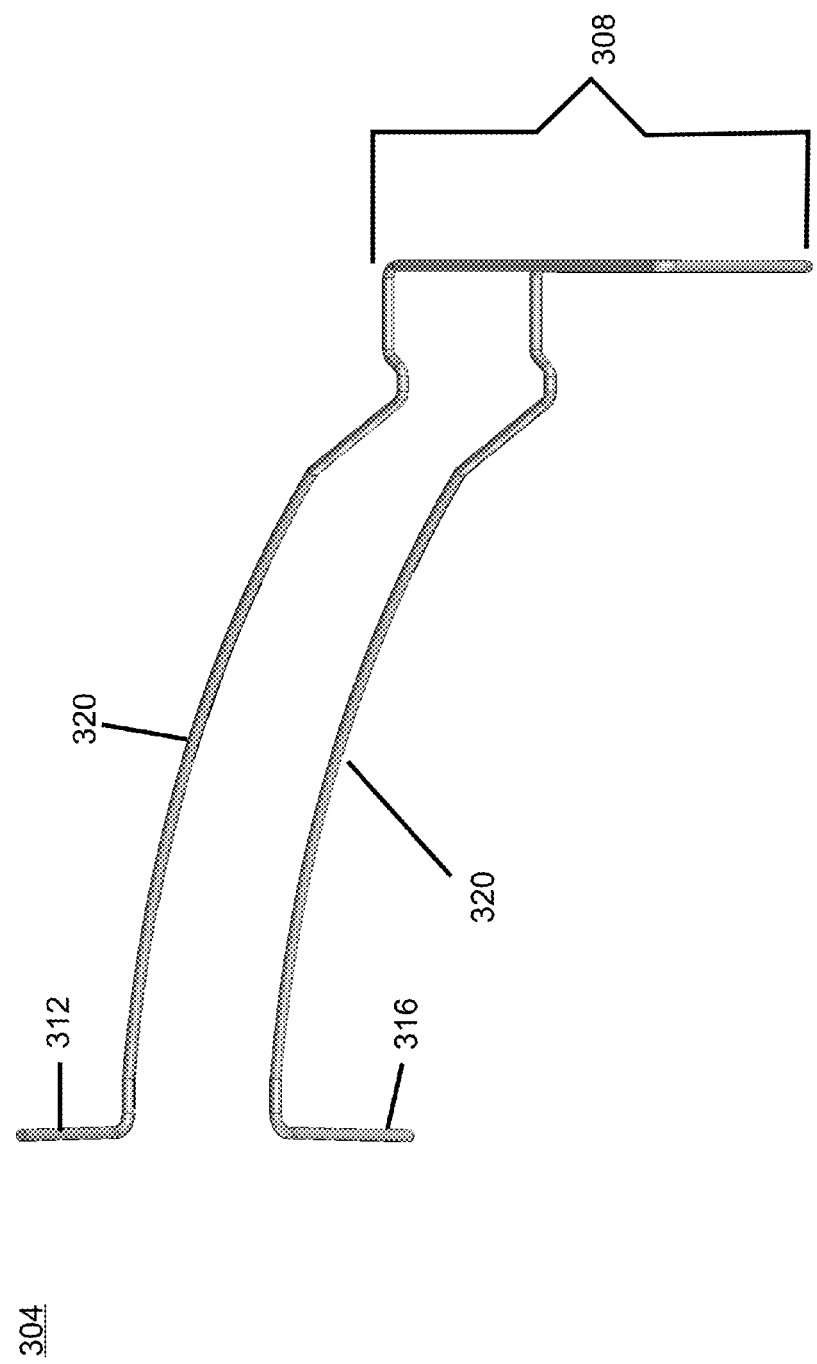
FIG. 5 is a bottom side perspective view of lace engagement component 304.

FIG. 4 and FIG. 5 show views of a lace engagement component 304. FIG. 4 is a rear side perspective view of lace engagement component 304. FIG. 5 is a bottom side perspective view of lace engagement component 304. The lace engagement component may be described as having a wall mount engagement 308, a set of one or more lace engaging fingers 312, 316 to engage one or more laces, and a set of spring portions 320 between the lace engaging fingers 312, 316 and the wall mount engagement 308.

The lace engagement component 304 may be made from a range of suitable materials, preferably a material that will not oxidize or otherwise discolor the football 100 or laces 150. Stainless steel such as T302 tempered stainless steel is one suitable material.

Those of skill in the art will recognize that a variety of wire stock may be used although the choice of wire stock may influence other aspects of the design. Here are the qualities of one wire stock (Inter Wire Group of Armonk N.Y. item number 0800SSCL) that has provided suitable results.

Description: 0.080 T302 S/S CL.
Specification 1: ASTM-A313-08.
Specification 2: SAE-J230-94.
TENS STR MAX PSI-257,000.
TENS STR MIN PSI-249,000.

Figure 6:
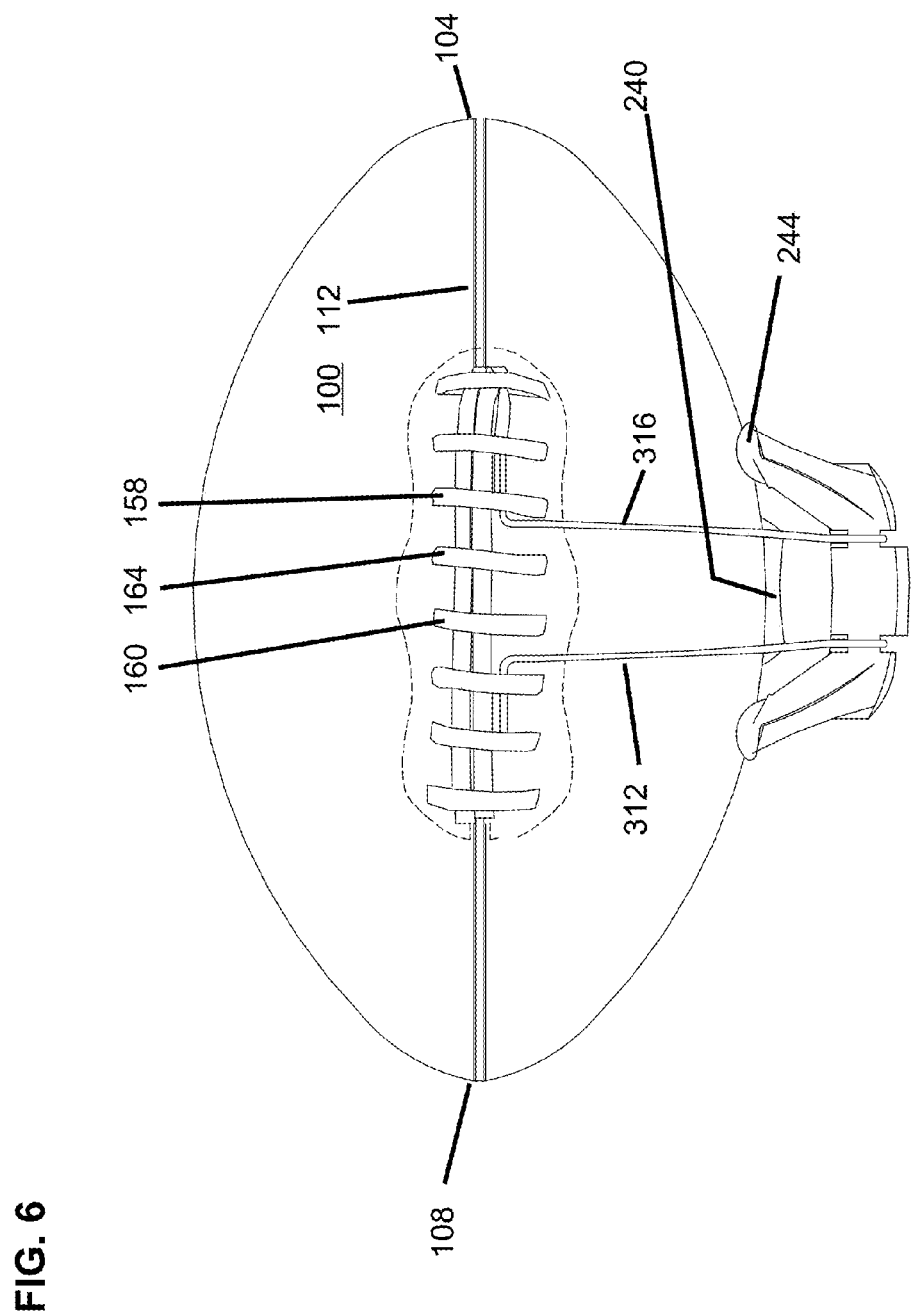
FIG. 6 is a top view of a football 100 engaged with a wall mount assembly 200 before the wall mount assembly 200 is placed over fastener heads protruding from a prepared wall.

FIG. 6 is a top view of a football 100 engaged with a wall mount assembly 200 before the wall mount assembly 200 is placed over fastener heads protruding from a prepared wall. A first seam 112 is essentially on the top of the football 100 as mounted. The a second seam, essentially 90 degrees offset from the first seam 112 runs among the fingers 244 extending from the ball-facing side 240 of the wall mount component 204. One of skill in the art will recognize that the weight of the football 100 will cause the football 100 to drop both the football 100 and the distal end of the lace engagement component 304 after the user releases an engaged football 100 after engagement with the wall mount. The lace engaging fingers 312 and 316 are shown engaged to two latitudinal laces 158 per lace engaging finger. To engage a lace engaging finger 312 or 316 with one or more latitudinal laces 158, the lace engaging finger 312 or 316 is moved by bending spring portion 320 and placing the tip 324 or 330 (FIG. 4) under the one or more latitudinal laces 158 to be engaged. Releasing spring portion 320 provides sustained engagement with the one or more latitudinal laces 158 as one would need to work against the spring portion 320 in order to disengage the lace engaging finger 312 or 316 from the engaged latitudinal laces 158.

Figure 7:
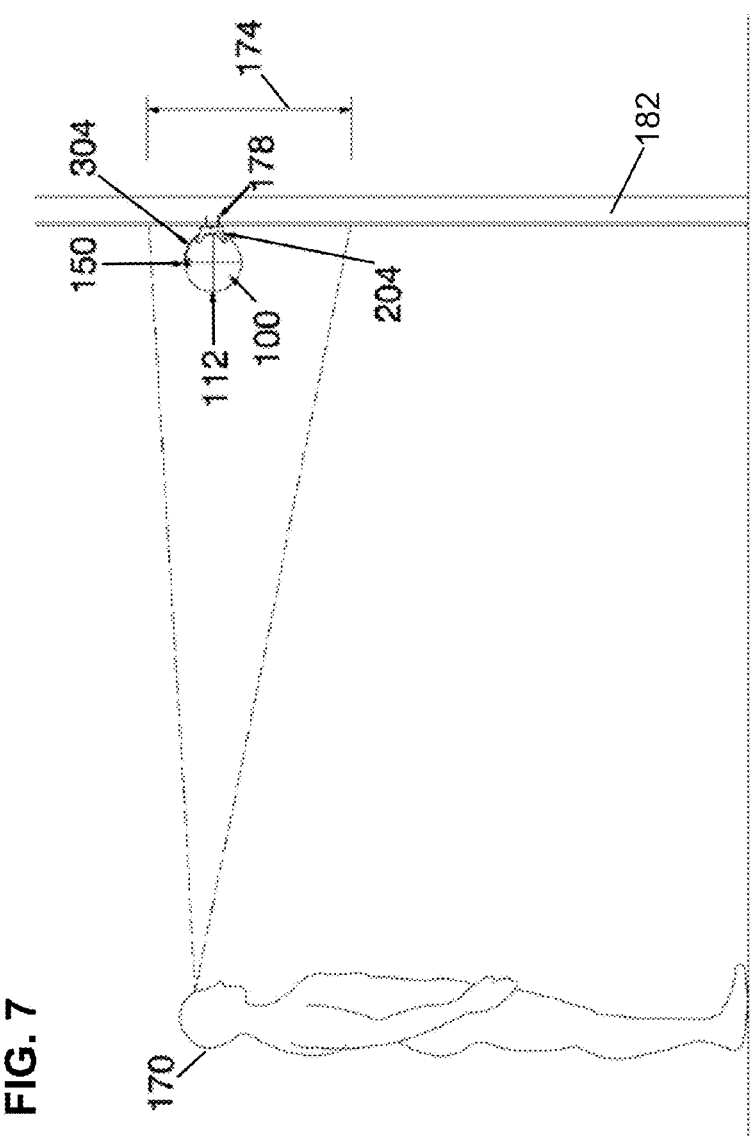
FIG. 7 shows an observer 170 looking at a football 100 that is engaged with a wall mount assembly 200.

FIG. 7 shows an observer 170 looking at a football 100 that is engaged with a wall mount assembly 200 with wall mount component 204 and lace engagement component 304 engaging a set of laces 150 on the top of the football 100. Fasteners such as screws (not shown here) connected to wall 182 engage with the wall mount component 204 to suspend the football 100 in a manner that is not visible to observer 170 as the football 100 is between the observer 170 and the wall mount component 204 in this head on line of vision 174. The lace engaging fingers 312 and 316 may be set to engage latitudinal laces 158 on the wall side of the longitudinal laces 154 and thus should be obscured except when the observer 170 stands on a stool close to the wall 182 so that the observer 170 may view the football panel 116 located between the top of the football 100 and the wall 182. Even when the observer 170 is in such a position, the lace engagement component 304 is not very noticeable.

The lace engagement component 304 may optionally be made with lace colored lace engaging fingers 312 and 316 and spring portion 320 made to blend with brown leather or whatever color is used for a commemorative football.

Process of Mounting the Football.

Figure 11:
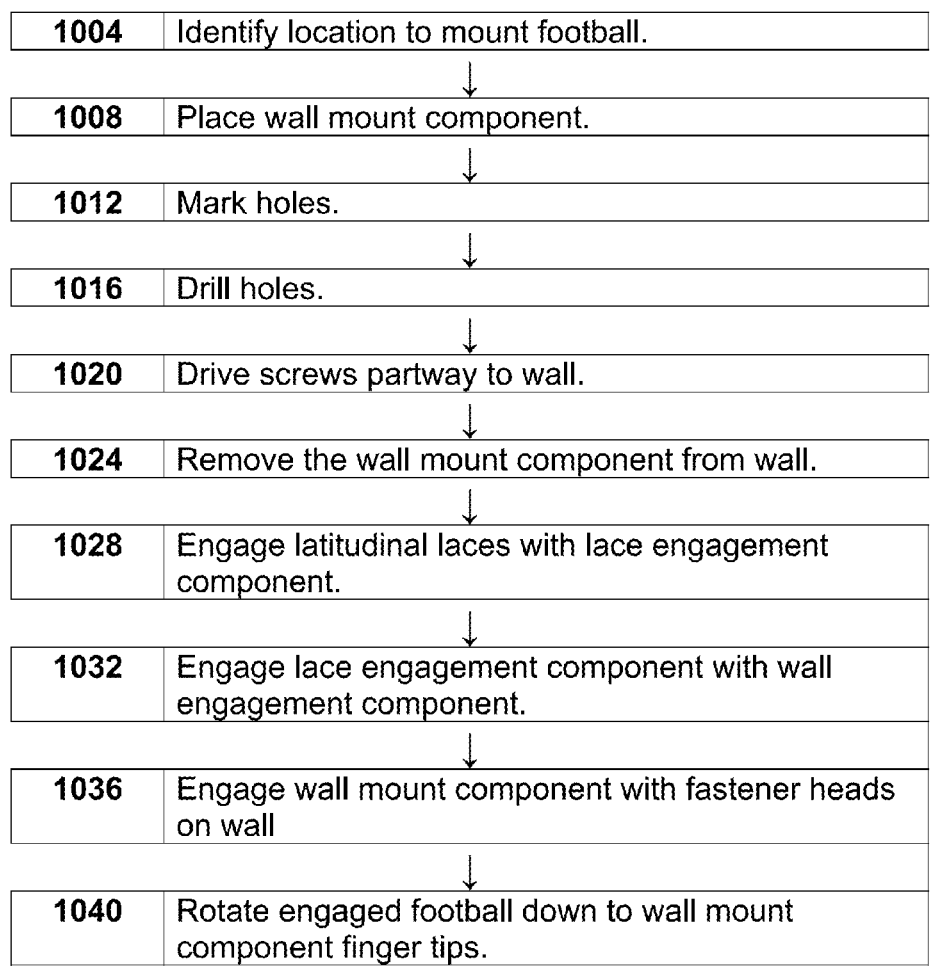
FIG. 11 is a flow chart for a process to mount the football using a football wall mount assembly.

FIG. 11 is a flow chart for a process 1000 to mount the football 100 using a wall mount assembly 200.

Step 1004. Find a desired location where you would want to mount the football 100 on the wall 182.

Step 1008. Place the wall mount component 204 against the wall 182 at the desired position including desired height from floor. Please note that the wall mount component 204 must be facing in the "UP" direction as noted on the wall mount component. Optionally, a stud sensor may be used to locate a wood stud to reduce the need for a dry wall anchor.

Step 1012. Mark holes with a pencil through the smaller portion 216 of the fastener engaging slots 212. Remove the wall mount component 204 from the wall 182.

Step 1016. Using a power drill and a 9/32 inch drill bit, drill holes into wall 182 through marks made in Step 1012. Add wall anchors to dry wall if you did not drill into a wood stud. Those of skill in the art will appreciate that the drill bit will be proportional in diameter to the fastener used. Using a smaller drill bit such as a 3/16 inch drill bit will allow for a tighter fit in dry wall for a fastener that could be placed into a hole created with a 9/32 inch drill bit. Those of skill in the art can vary the size and number of fasteners while staying within the scope of the teachings of the present disclosure.

Step 1020. Using a power drill or screwdriver, drive provided fasteners (screws) into studs (or drywall anchors) through the fastener engaging slots 212 and into the wall 182. Do not tighten the fasteners to drive the fastener heads flush with the wall. Leaving an offset between the fastener heads and the wall mount component 204 allows reversible attachment of the wall mount component 204 with the wall 182 by using the fastener engaging slots 212 and sliding the wall mount component 204 upward releasing wall mount component 204 from the wall 182.

Step 1024. Move the sliding the wall mount component 204 upward releasing wall mount component 204 from the wall 182.

Step 1028. Bend the spring portion 320 (FIG. 5) of the lace engagement component 304 as needed to guide the lace engaging fingers 312 and 316 through the latitudinal lace 158 as shown in FIG. 6. For a football 100 such as shown in FIG. 6, it may be desirable to engage the middle two latitudinal laces 158 in the four latitudinal on either side of the equator 120. Release spring portion 320 (FIG. 5).

Step 1032. After engaging latitudinal laces 158 with the lace engaging fingers 312 and 316 of the lace engagement component 304, engage the wall mount engagement 308 of the lace engagement component 304 with the wall mount component 204 by guiding the wall mount engagement 308 into a slot 280 in the wall-facing side 208 the wall mount component 204.

Step 1036. Rotate the football 100 to allow viewing of the fastener engaging slots 212 with the screw heads of the fasteners protruding from the wall 182. After engaging the screw heads of the fasteners, slide the wall mount component 204 downward to secure the wall mount component 204 to the wall 182.

Step 1040. Rotate the football 100 down allowing the football 100 to come to rest against the finger tips 248 (FIG. 3) of the wall mount component 204.

NOTE: It is possible that the football 100 will not make contact with all four finger tips 248 of the wall mount component 204 after mounting as the rigidity of the wire in the lace engagement component 304 support the weight of the football 100 to hold the football 100 in a proper vertical orientation. Depending on the stiffness of the lace engagement component 304, the football 100 may make contact with all, some, or none of the finger tips 248 of the wall mount component 204. Thus, a designer may choose to have a wall mount component that lacks fingers 244 and rely on the stiffness of the lace engagement component 304 to hold the football 100 out from the wall.

The process is complete and the user may step back and enjoy viewing the collectible football 100 that now appears to be suspended without support near the wall 182 as the wall mount component 204 is hidden from view by the football 100.

Short Wire for Autographed Footballs.

Figure 8:
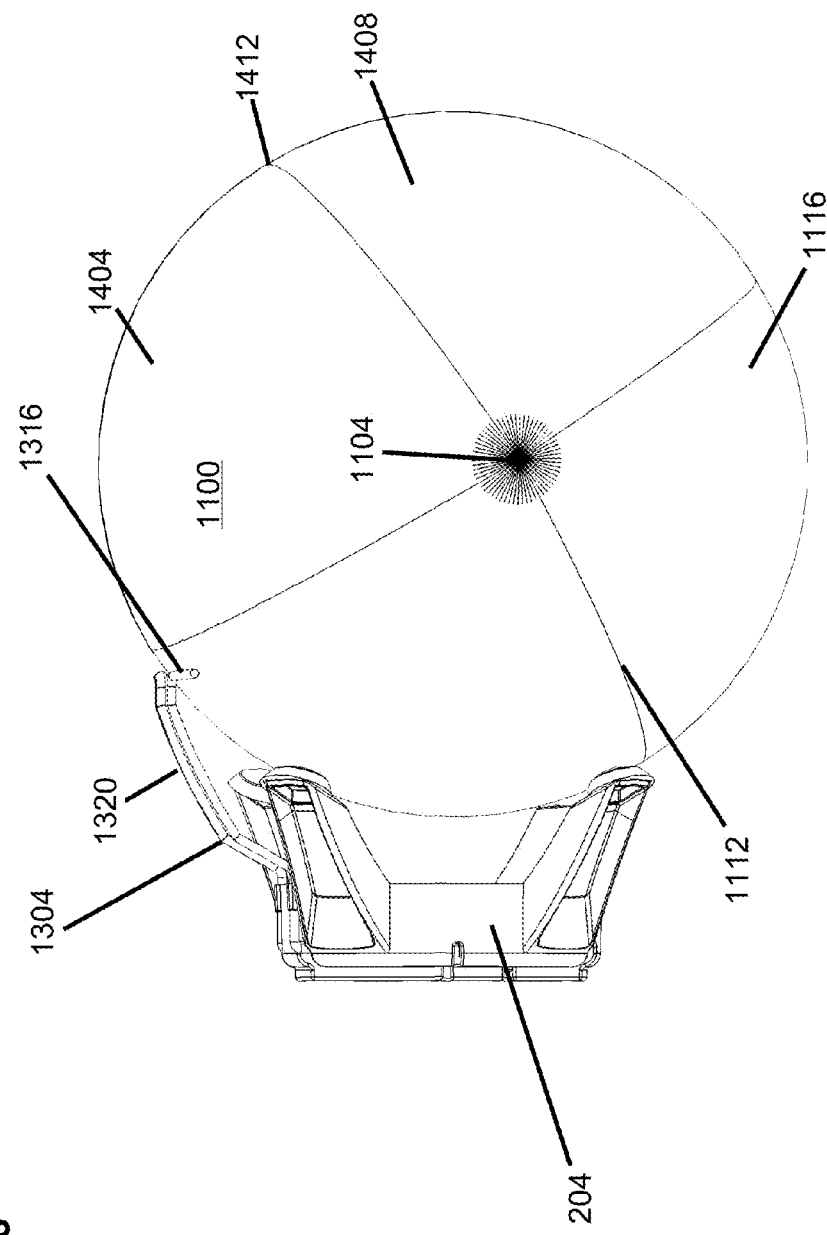
FIG. 8 shows an alternative lace engagement component designed to display an autographed or otherwise annotated football.

FIG. 8 shows a computer aided drafting image of a football 1100 (without laces in this model) engaged with an alternative to lace engagement component 304 discussed above. This short wire lace engagement component 1304 is designed to engage laces not at the top of the football as discussed above but partially rotated towards the wall. This rotation allows panel 1404 which would typically have the insignia for the NFL, NCAA, or other relevant insignia for this football 1100 and panel 1408 which is typically unadorned when manufactured. This panel 1408 provides a place for a signature or other markings (such as Game Ball 2012 Champion Game) or other annotations. Rotating the laces towards the wall mount component 204 to display the signature or other annotations on panel 1408 may be desired by some users for some footballs 1100. Thus, a portion of the seam 1412 on the top side of panel 1408 is well above the longitudinal axis of the football 1100 that runs from pole 1104 to the opposite pole (not seen in FIG. 8).

Figure 10:
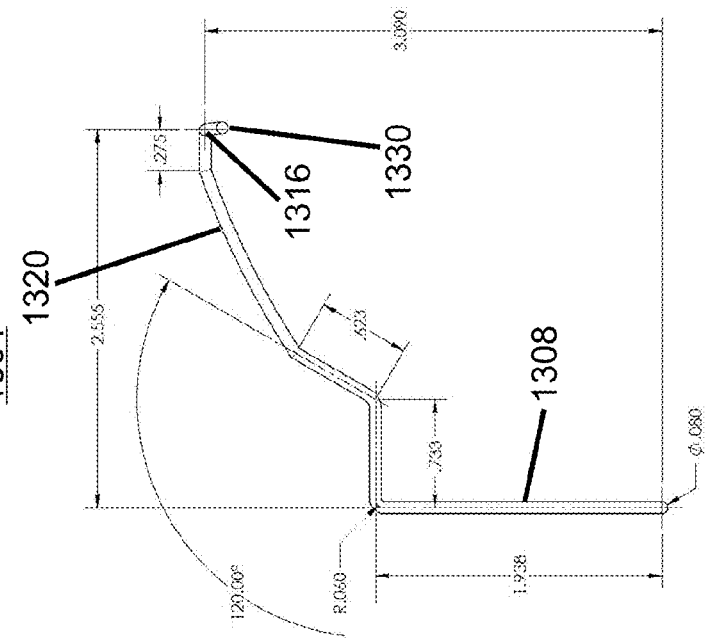
FIG. 10 shows a side view of short wire lace engagement component.
Figure 9:
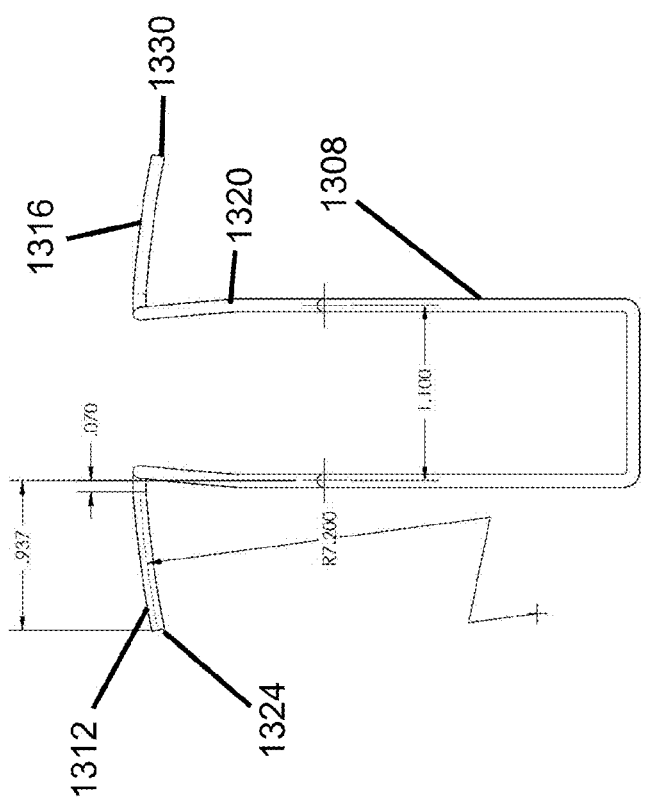
FIG. 9 shows a back view of short wire lace engagement component.

FIG. 9 shows a view of short wire lace engagement component 1304 as viewed from the wall looking towards an engaged football 100. FIG. 9 provides a side view of the same short wire lace engagement component. Visible in FIG. 9 and FIG. 10 are: the wall mount engagement section 1308, lace engaging fingers 1312 and 1316 with tips 1324 and 1330, and spring section 1320. The geometry of the wall mount engagement section 1308 will need to cooperate with the wall mount component 204.

Alternative Engagements with Laces

While the figures discussed above had lace engagement finger 312 engaged with different latitudinal laces 158 than were engaged by lace engagement finger 316, this is not a requirement in order to use the teachings of the present disclosure. As one of skill in the art will appreciate, the lace engagement component 304 could be designed to allow lace engagement finger 316 to engage latitudinal laces 160 and 164 (FIG. 6) and extend towards first pole 104 and allow lace engagement finger 312 to also engage latitudinal laces 160 and 164 and extend towards second pole 108.

One of skill in the art will appreciate that an alternative lace engagement component could be implemented to engage the longitudinal lace 154 in addition to or instead of engaging with one or more latitudinal lace 158. For example the lace engaging fingers 312 and 316 that are adapted to engage one or more of the latitudinal laces 158 could be replaced with hooks (not shown) which may be substantially "U" shaped, that would engage one or more of the longitudinal laces 154. However, the best use of the longitudinal laces 154 may be to help conceal lace engaging fingers 312 and 316 by routing the fingers under one or more of the longitudinal laces 154. In most instances, engaging with the latitudinal laces 158 provides the best resistance to gravity and keeps the football 100 secured better than alternative engagements with the longitudinal laces 154.

Use of Augmentation Band with Football.

Introduction of Components.

Figure 12:
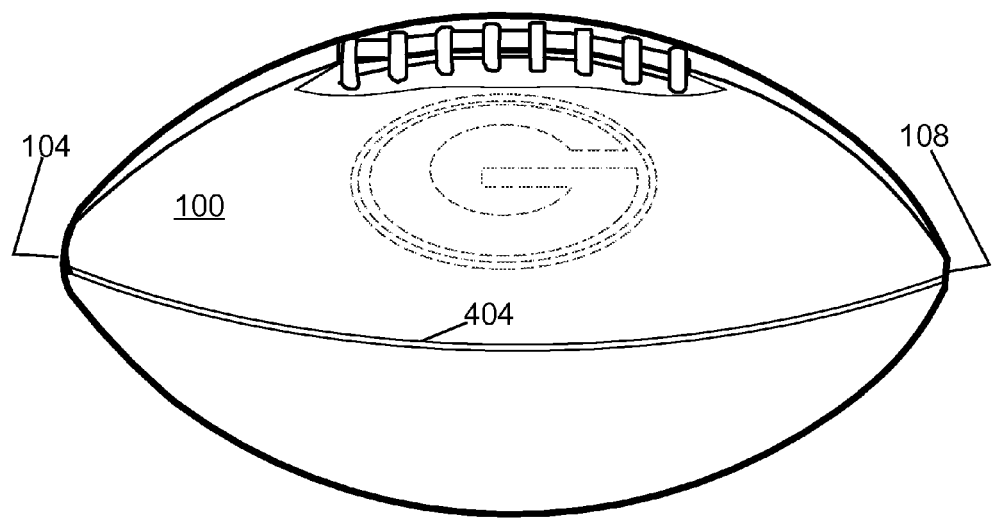
FIG. 12 is a football in a horizontal orientation with an augmentation band.
Figure 13:
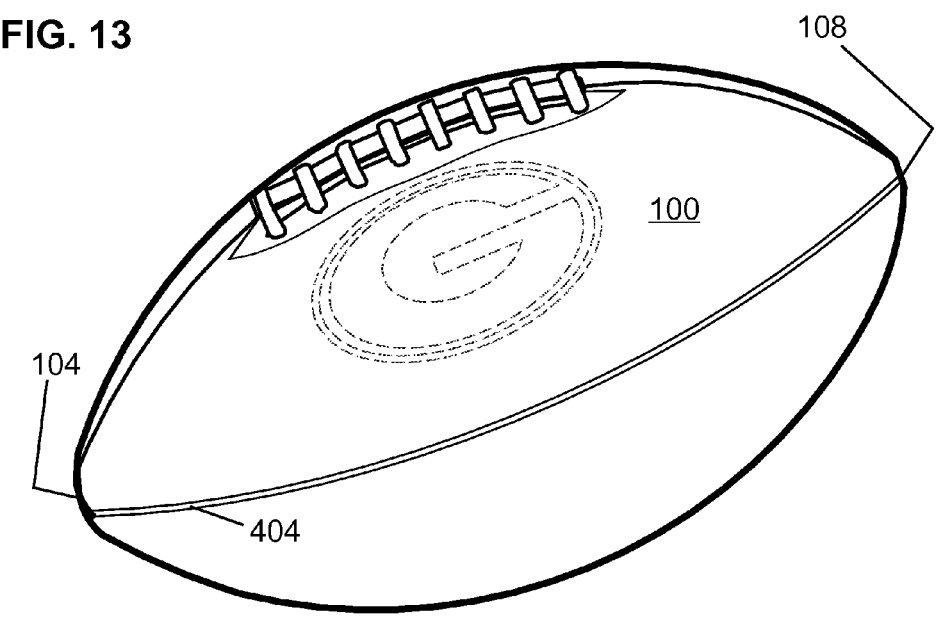
FIG. 13 is a football in a non-horizontal orientation with an augmentation band.

As shown in FIG. 12 and FIG. 13, a football 100 with a first pole 104 and a second pole 108 may be mounted using an augmentation band 404. The use of an augmentation band 404 allows the football 100 to be displayed with the first pole 104 horizontal with the second pole 108 as shown in FIG. 12. The use of an augmentation band 404 also allows the football 100 to be displayed with the first pole 104 non-horizontal with the second pole 108. The first pole 104 may be below the second pole 108 as shown in FIG. 13, or with the first pole 104 above the second pole 108. The relationship between the poles may be horizontal, vertical, or any angle between horizontal and vertical As explained in more detail below, to augment the support of the football, an augmentation band 404 may be placed in the seam 112 of the football 100 and engages a feature (such as a slot or groove) in the wall mount assembly.

The augmentation band 404 color may be chosen to be clear, black, or any color including the color of the football 100 at the seam 112. The choice of color for the augmentation band 404 may be a choice to make the augmentation band 404 difficult to notice. Conversely, the color of the augmentation band 404 may be a vivid color that is easy to notice, perhaps with one of the colors associated with the football team associated with the mounted football 100.

Figure 14:
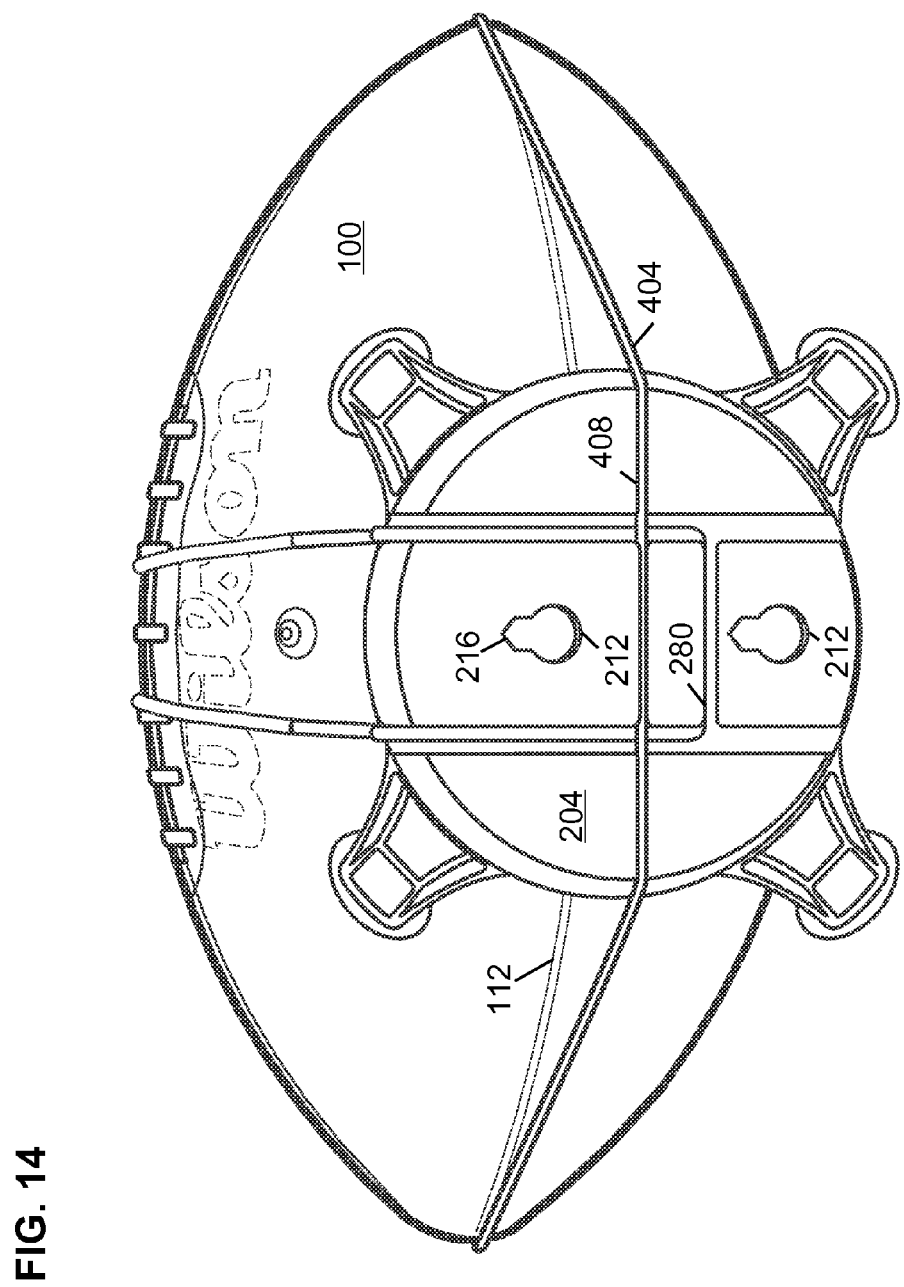
FIG. 14 shows an interaction between an augmentation band and a band slot in a wall mount component.

FIG. 14 shows the interaction of the augmentation band 404 with a band slot 408 in the wall mount component 204. Those of skill in the art will appreciate that the augmentation band 404 may interact with the wall mount component 204 in any of a number of ways known to those of skill in the art as long as the augmentation band 404 serves to help hold the football to the wall mount component 204.

Process with Augmentation Band

Figure 15:
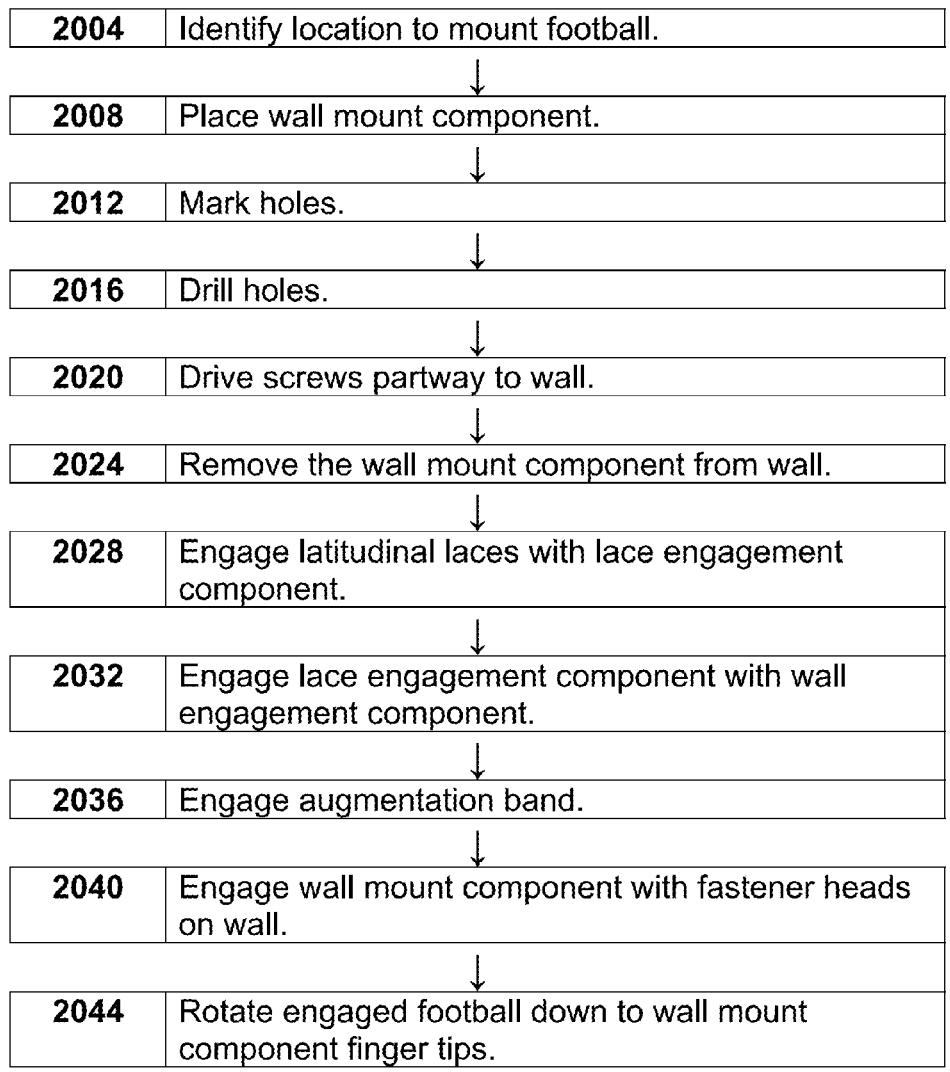
FIG. 15 is a flow chart for a process to mount the football using a football wall mount assembly with augmentation band.

FIG. 15 is a flow chart for a process 2000 to mount the football 100 using a football wall mount assembly 400 with augmentation band 404.

Step 2004. Find a desired location where you would want to mount the football 100 on the wall 182 (FIG. 7), or other flat surface such as a ceiling or a slanted wall.

Step 2008. Place the wall mount component 204 against the wall 182 or other flat surface at the desired position including desired height from floor. The term flat surface is purposefully more expansive than the vertical wall 182. A flat surface may be a ceiling substantially parallel with the floor or a slanted wall on an angle between perpendicular and parallel to a floor beneath the mounted football.

Optionally, a stud sensor may be used to locate a wood stud to reduce the need for a dry wall anchor. When the two fastener engaging slots 212 are placed in a vertical line, the long axis of the football 100 will be horizontal. In other words, the first pole 104 will be horizontal with the second pole 108.

Conversely, when the two fastener engaging slots 212 are in a horizontal line, the long axis of the football 100 will be in a vertical orientation. The deviation of the line between the two fastener engaging slots 212 from vertical equals the deviation of the long axis of the football 100 from horizontal. One of skill in the art will recognize that when the keyhole shaped fastener engaging slots 212 are rotated a significant amount from vertical, that additional care may be taken to ensure a snug fit between the wall side of the screw head and the ball side of the wall mount assembly so as to impose a friction fit to minimize a risk that vibration or other stimulus will cause the wall mount assembly to disengage from the wall.

Step 2012. Mark holes with a pencil through the smaller portion 216 of the fastener engaging slots 212. Remove the wall mount component 204 from the wall 182 or other flat surface.

Step 2016. Using a power drill and a 9/32" drill bit, drill holes into wall 182 or other flat surface through marks made in Step 2012. Add wall anchors to dry wall if you did not drill into a wood stud. Those of skill in the art will appreciate that the drill bit will be proportional in diameter to the fastener used. Using a smaller drill bit such as a 3/16 inch drill bit will allow for a tighter fit in dry wall for a fastener that could be placed into a hole created with a 9/32 inch drill bit. Those of skill in the art can vary the size and number of fasteners while staying within the scope of the teachings of the present disclosure.

Step 2020. Using a power drill or screwdriver, drive provided screws into studs (or drywall anchors) through the fastener engaging slots 212 and into the wall 182 or other flat surface. Balance the need to provide a friction fit for a ball mount project with an extreme angle with the need to be able to remove the wall mount component 204. Do not tighten the fasteners screws so tightly as to preclude removal of the wall mount component 204 from the wall 182 or other flat surface by using the fastener engaging slots 212 and sliding the wall mount component 204 toward the wide end of the fastener engaging slots 212 to release wall mount component 204 from the wall 182 or other flat surface.

Step 2024. Remove the sliding the wall mount component 204 from the wall 182 or other flat surface.

Step 2028. Bend the spring portion 320 (FIG. 5) of the lace engagement component 304 as needed to guide the lace engaging fingers 312 and 316 through the latitudinal lace 158 as shown in FIG. 6. For a football 100 such as shown in FIG. 6, it may be desirable to engage the middle two latitudinal laces 158 in the four latitudinal laces 158 on either side of the equator 120. Release spring portion 320 (FIG. 5).

Step 2032. After engaging latitudinal laces 158 with the lace engaging fingers 312 and 316 of the lace engagement component 304, engage the wall mount engagement 308 of the lace engagement component 304 with the wall mount component 204 by guiding the wall mount engagement 308 into a slot 280 in the wall-facing side 208 the wall mount component 204.

Step 2036. Stretch the augmentation band 404 around the football 100 and guide the augmentation band 404 into the band slot 408 on the wall-facing side 208 of the wall mounting bracket 204 as shown in FIG. 14.

Step 2040. Rotate the football 100 to allow viewing of the fastener engaging slots 212 and the fastener screw heads protruding from the wall 182 or other flat surface. After engaging the screw heads, slide the wall mount component 204 to move the screw heads towards the smaller portion 216 of the fastener engaging slots 212 to secure the wall mount component 204 to the wall 182 or other flat surface.

Step 2044. Rotate the football 100 down allowing the football 100 to come to rest against the finger tips 248 (FIG. 3) of the wall mount component 204.

It is more likely that the football 100 held by both the lace engagement component 304 and an augmentation band 404 will make contact with all four of the finger tips 248 (FIG. 3) of the wall mount component 204, than in an installation not using the augmentation band 404. Thus, a user may choose to use the augmentation band 404 even when mounting a football 100 with the long axis horizontal when a firmer engagement between the football and the football wall mount assembly 400 is desired.

The football 100 is now mounted. The user and all guests may enjoy viewing the collectible football 100 that now appears to be suspended without support near the wall 182 or other flat surface as the wall mount component 204 is hidden from view by the football 100. When using a clear augmentation band 404, the augmentation band 404 is not particularly visible as the augmentation band 404 is positioned within a recessed area in the seam 112 of the football.

One of skill in the art will recognize that the use of the augmentation band 404 may be used when attaching the wall mount assembly to a wall that is not vertical (as often happens around the perimeter of finished attic spaces). Likewise, an augmentation band 404 may be used when the wall mount component 204 is placed or onto a ceiling.

Materials.

The augmentation band 404 may be made of material appropriate for this use. An augmentation band may be formed by fusing together material to create an appropriate size. For the mount assembly shown and a regulation size college or NFL football, an augmentation band made by fusing a 23 inch length of material end to end. One of skill in the art will recognize that the range appropriate lengths will be driven by the elasticity of the band material, the shape of the mounting assembly, and the size of the regulation ball to be held.

A material with an approximately 1.8 mm diameter that is suitable for creating augmentation bands is sold under the trade name Stretch Magic® by Pepperell Braiding located in Pepperell Massachusetts. This material is widely available as it may be used for jewelry projects as it allows the jewelry to expand for removal from the body. The material is resistant to ultraviolet radiation and ozone. The material is available in several colors including clear.

Note a user may opt to not use the augmentation band 404 but still orient the long axis of the football 100 at an angle that is significantly different than horizontal. There are limits on how much of a deviation can be made without the use of the augmentation band. Frequently footballs can be mounted up to ten degrees off of horizontal without the use of the augmentation band.

Kits.

It is advantageous to sell a single wall mount component 204 with a set of two or more lace engagement components (such as 304 or 1304) that have the capacity to work with the one wall mount component 204. This allows a purchaser of the wall mount kit to use the wall mount assembly to display a football 100 with the laces 150 on the top of the football 100 as shown in FIG. 7 or with the laces 150 rotated towards the wall mount component 204 to prominently display a lower panel with a signature or other notation.

A kit may include lace engagement components that are adapted for a football that has a different girth than found in the NCAA or NFL footballs, such as a rugby football, youth football, or a non-regulation sized commemorative football. A kit may include screws and dry wall anchors.

The kit may include one or more augmentation bands 404 for use in augmented mounting such as for use with footballs 100 to be mounted with their long axis at an angle significantly different from horizontal.

The mounting assembly components may be shipped with a football, thus the football may be deemed part of the kit. The ball may be a commemorative ball, or a signed ball.

Using an Inelastic Band.

Using the wall mount component 204 (FIG. 3) but not the lace engagement component 304 (FIG. 3), a basketball may be mounted to the wall using an inelastic band.

Figure 16:
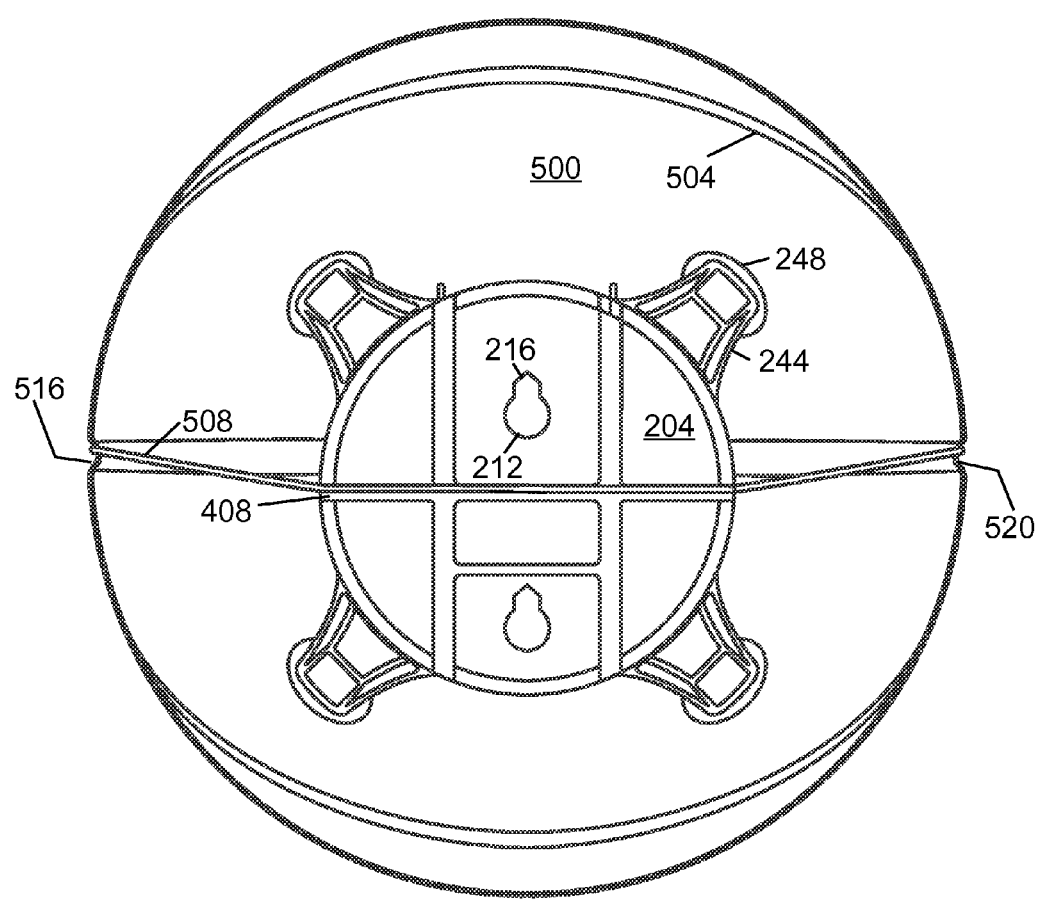
FIG. 16 shows an inelastic band holding a basketball to a wall mount component.

FIG. 16 shows a basketball 500 with a set of seams 504. Each seam 504 provides a recessed channel running around a circumference of the basketball 500 including a first pole 516 and a second pole 520. A mount assembly 550 includes an inelastic band 508 which may be placed in a seam 504 of the basketball 500 and used to retain the basketball 500 against the finger tips 248 of the set of fingers 244 on the wall mount component 204. The inelastic band 508 may be created of relatively inelastic material given the process for mounting the basketball 500 set forth below. The inelastic band 508 may have some limited elasticity but sufficient inelastic behavior to be effective in a use as set forth below. The basketball 500 could be a full sized basketball with an inflated diameter of 29.5 to 29.875 inches as used in the National Basketball Association (NBA) or National Collegiate Athletics Association (NCAA) for men's basketball. The basketball could be the women/intermediate size of 28.5 inches in inflated diameter. The basketball could be a youth size of 27 or 27.5 inches in inflated diameter. The basketball could be another size such as a special commemorative ball. Those of skill in the art will recognize that an inelastic band will need to be sized for a small range of diameters and that basketballs of materially different sizes will need inelastic bands that target the particular size of the basketball.

Process of Using an Inelastic Band.

The process to mount a basketball to the wall may be performed as follows.

Figure 17:
FIG. 17 is a flow chart for a process to mount a basketball using a mount assembly with an inelastic band.

FIG. 17 is a flow chart for a process 3000 to mount the basketball 500 using a mount assembly 550 with an inelastic band 508.

Step 3004. Find a desired location where you would want to mount the basketball 500 on the wall 182 (FIG. 7), or other flat surface such as a ceiling or a slanted wall.

Step 3008. Place the wall mount component 204 against the wall 182 or other flat surface at the desired position including desired height from floor. The term flat surface is purposefully more expansive than the vertical wall 182. A flat surface may be a ceiling substantially parallel with the floor or a slanted wall on an angle between perpendicular and parallel to a floor beneath the mounted basketball.

Optionally, a stud sensor may be used to locate a wood stud to reduce the need for a dry wall anchor. When the two fastener engaging slots 212 are placed in a vertical line, the axis of the basketball 500 between the first pole 516 and the second pole 520 will be horizontal. In other words, the first pole 516 will be horizontal with the second pole 520. The smaller portion 216 of the fastener engaging slots 212 should be on the high side of the fastener engaging slots 212 for flat surfaces that are walls or slanted walls.

Conversely, when the two fastener engaging slots 212 are in a horizontal line, the axis of the basketball 500 between the first pole 516 and the second pole 520 will be vertical. In other words, the first pole 516 will be in a vertical line above or below the second pole 520. The deviation of the line between the two fastener engaging slots 212 from vertical equals the deviation of the axis of the basketball 500 between the first pole 516 and the second pole 520 will be from horizontal.

One of skill in the art will recognize that when the keyhole shaped fastener engaging slots 212 are rotated a significant amount from vertical, that additional care may be taken to ensure a snug fit between the wall side of the screw head and the ball side of the wall mount component 204 so as to impose a friction fit to minimize a risk that vibration or other stimulus will cause the mount assembly 550 to disengage from the wall.

Step 3012. Mark holes with a pencil through the smaller portion 216 of the fastener engaging slots 212. Remove the wall mount component 204 from the wall 182 or other flat surface.

Step 3016. Using a power drill and a 9/32" drill bit, drill holes into wall 182 or other flat surface through marks made in Step 3012. Add wall anchors to dry wall if you did not drill into a wood stud. Those of skill in the art will appreciate that the drill bit will be proportional in diameter to the fastener used. Using a smaller drill bit such as a 3/16 inch drill bit will allow for a tighter fit in dry wall for a fastener that could be placed into a hole created with a 9/32 inch drill bit. Those of skill in the art can vary the size and number of fasteners while staying within the scope of the teachings of the present disclosure.

Step 3020. Using a power drill or screwdriver, drive provided screws into studs (or drywall anchors) through the fastener engaging slots 212 and into the wall 182 or other flat surface. Balance the need to provide a friction fit for a ball mount project with an extreme angle with the need to be able to remove the wall mount component 204. Do not tighten the fasteners screws so tightly as to preclude removal of the wall mount component 204 from the wall 182 or other flat surface by using the fastener engaging slots 212 and sliding the wall mount component 204 toward the wide end of the fastener engaging slots 212 to release wall mount component 204 from the wall 182 or other flat surface.

Step 3024. Remove the sliding the wall mount component 204 from the wall 182 or other flat surface.

Step 3028 Optional Step—If the basketball 500 is not already deflated, then deflate the basketball 500 to be mounted in the mount assembly 550. Deflation allows for the basketball 500 to be placed properly in the mount assembly 550 prior to re-inflating the basketball 500. The deflation and re-inflation cycle is necessary due to the fact that the inelastic band 508 is rigid and does not stretch or give or is substantially inelastic and does not stretch or give a significant amount.

Step 3032. Align the basketball 500 with the fingertips 248 of the set of fingers 244.

Step 3036. Guide the inelastic band 508 into the band slot 408 provided on the back of the wall mount component 204 and around the perimeter of the basketball 500 in as seam 504 as shown in FIG. 16. Placement of an inelastic band 508 into a seam 504 places the inelastic band 508 below the textured surface of the basketball 500. Using an inelastic band 508 that is colored to match the color of the seam 504 (often black) further reduces the visibility of the inelastic band 508 to an observer focused on the basketball 500.

Step 3040. Once the inelastic band 508 is in place, slowly inflate the basketball 500 to expand the basketball 500 so the basketball 500 is firmly retained by the inelastic band 508 to the wall mount component 204. The basketball 500 may need to be inflated to regulation pressure or something slightly less. As the mounted basketball 500 will not be bounced on the ground while mounted for display and the human eye will not notice a small difference in ball diameter, it is not a problem if the basketball 500 is not totally inflated.

Step 3044. Align the protruding heads of the mounting screws with fastener engaging slots 212 and slide wall mount component 204 in position with the heads of the mounting screws in the smaller portion 216 of the fastener engaging slots 212 with the basketball 500 secured properly as shown in FIG. 18.

Figure 18:
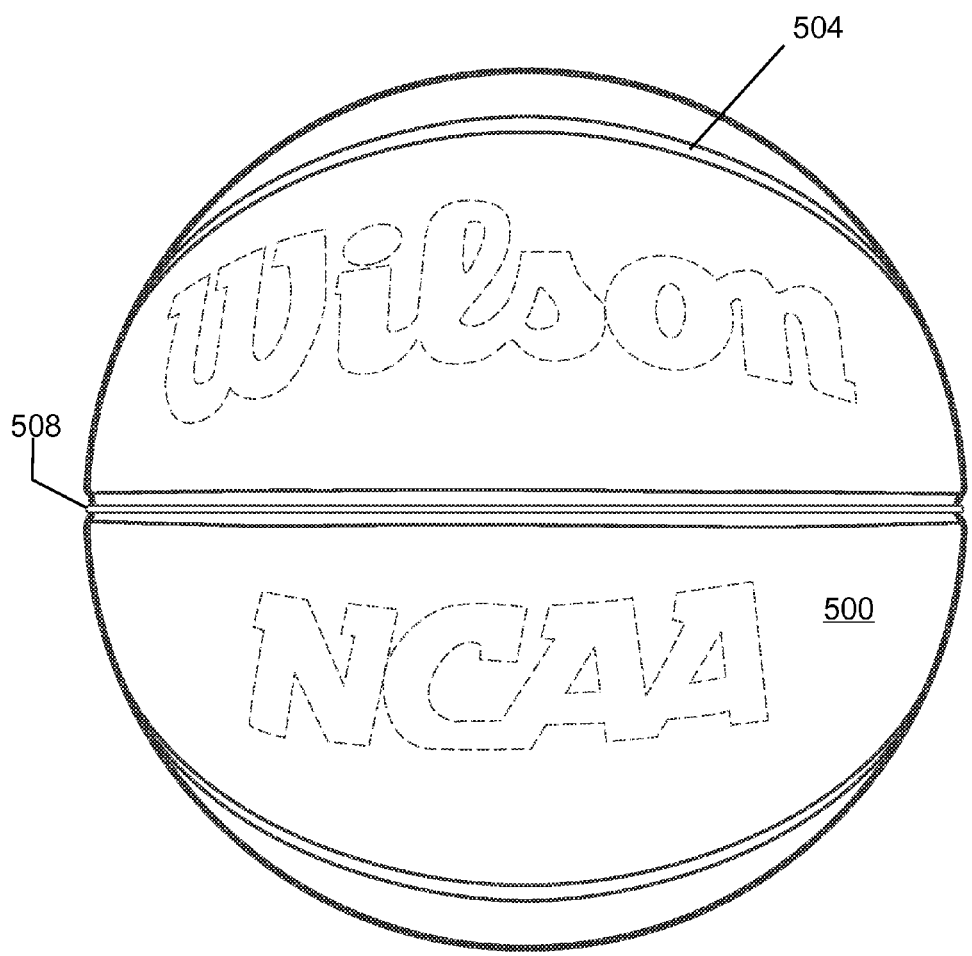
FIG. 18 shows a mounted basketball from the vantage point of an observer.

As illustrated in FIG. 18, the basketball 500 appears to float near the flat surface as the inelastic band 508 is difficult to discern in the seam 504. The wall mount component 204 is between the basketball 500 and the flat surface and not readily seen from the vantage point of an observer.

Materials.

The inelastic band 508 may be made of black nylon coated wire from Berkley (Steelon black nylon coated wire—part number D45BL (1060693)), see http://www.berkley-fishing.com/products/terminal-tackle/leaders/steelon-nylon-coated-wire. The black nylon coated wire is rated for fishing use as 45-lb test. The length of the band may be 30.5 to 30.75 inches, but the length will be a function of the geometry of the wall mount component 204 and the inflated diameter of the basketball 500 to be displayed. The two ends of the black nylon coated wire may be joined together by a black connector sleeve by Berkeley Fishing (product number B3BL). See http://www.berkley-fishing.com/products/terminal-tackle/leaders/connector-sleeves. Note that Berkley® is a registered trademark of Pure Fishing, Inc.

Those of ordinary skill in the art will be able to adopt the teachings with respect to the inelastic band to use other materials or to use other termination methods, especially since the termination may be placed behind the basketball 500 so the termination is not readily seen.

Kits.

It is advantageous to sell a single wall mount component 204 with a set of two or more inelastic bands 508 of different lengths so that an end user may use the single wall mount component with different inelastic bands to mount basketballs of different diameters. A kit may include screws and dry wall anchors.

The kit may further contain materials that allow the wall mount component to be used with a football (with or without the use of an augmentation band). Thus, the kit may include a set of two or more lace engagement components (such as 304 or 1304) that have the capacity to work with the one wall mount component 204. This allows a purchaser of the wall mount kit to use the wall mount assembly to display a football 100 with the laces 150 on the top of the football 100 as shown in FIG. 7 or with the laces 150 rotated towards the wall mount component 204 to prominently display a lower panel with a signature or other notation.

A kit may include lace engagement components that are adapted for a football that has a different girth than found in the NCAA or NFL footballs, such as a rugby football or a smaller commemorative football.

The kit may include one or more augmentation bands 404 for use in augmented mounting such as for use with footballs 100 to be mounted with their long axis at an angle significantly different from horizontal.

The mounting assembly components may be shipped with a football or basketball, thus the ball may be deemed part of the kit. The ball may be a commemorative ball, or a signed ball.

Alternatives and Variations

Use of Inelastic Band with a Football.

Those of skill in the art will appreciate that a football may be deflated, engaged with an appropriately sized inelastic band and re-inflated in keeping with the teachings expressed above in connection with the basketball example. Thus, the teachings of the present disclosure and the claims that follow should be interpreted accordingly and not limited to a basketball. The use of one or more inelastic bands with a football may be done with or without the use of a lace engagement component (304 or 1304) depending on the desired rotation of the football and user preferences.

Band Engagement.

While the examples above have shown both the augmentation band 404 and the inelastic band 508 engaging with a band slot 408 in the wall mount component 204, those of skill in the art will appreciate that the augmentation band 404 or the inelastic band 508 could engage the wall mount component 204 through a wide array of other protrusions or channels located on the wall facing side of the wall mount component 204, the ball facing side of the wall mount component 204, the perimeter of the wall mount component 204, or an interior channel in the wall mount component 204.

Use of More than One Inelastic Band.

The examples set forth above have shown the use of a single inelastic band 508 to engage a portion of a ball seam running from a first pole to the second pole substantially at the longitudinal midline of the ball (perpendicular to the equator). Those of skill in the art will appreciate that if the ball was rotated to have a panel rather than a seam at this longitudinal midline, that a pair of inelastic bands 508 could be used with one inelastic band 508 engaging a seam above the longitudinal midline of the ball and one inelastic band 508 engaging a seam below the longitudinal midline of the ball.

Optionally, a second band slot 408 or other type of band engagement may be included on a modified wall mount component for use with a pair of inelastic bands. Kits may include additional inelastic bands to provide this option.

Other Balls.

While the examples provided were footballs and basketballs, the teachings of the present disclosure can be extended to using augmentation bands or inelastic bands to secure other types of balls with seams to a wall mount component. Many volleyballs have seems that run for at least a portion of a perimeter of the ball and could be secured with an appropriate length band.

Multiple Smaller Portions per Fastener Engagement Slots.

One of skill in the art will appreciate that placing a second or third smaller portion 216 extending from the fastener engagement slot 212 will provide additional options for providing a range of possible angular orientations of the wall mount component and thus the engaged ball.

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure.

What is claimed is:

1. A method for mounting an engaged ball to a flat surface using an inelastic band, the method comprising:
   obtaining a ball with at least one seam running from a first pole to a second pole, the at least one seam defining a groove in the ball;
   identifying a portion of the flat surface to receive the engaged ball;
   engaging fasteners with the flat surface so that protruding fastener heads can be used to secure a wall mount component with an engaged ball to the flat surface;
   aligning the ball against the wall mount component;
   engaging the inelastic band with the wall mount component and placing the inelastic band around the ball, wherein the inelastic band is positioned within the groove in the ball to create the engaged ball;
   after engaging the inelastic band with the wall mount component and placing the inelastic band around the ball, at least partially inflating the engaged ball to expand the engaged ball towards regulation size for that type of ball; and engaging the wall mount component and the engaged-ball to protruding fastener heads.

2. The method of claim 1 wherein the ball is a basketball.

3. The method of claim 1 wherein the ball is a football.

4. The method of claim 1 wherein the ball is mounted on the flat surface with the first pole located below the second pole.

5. The method of claim 4 wherein an absolute value of an angle for a deviation of the first pole and second pole relative to horizontal exceeds 10 degrees.

6. The method of claim 4 wherein the first pole and the second pole are in a vertical relationship.

7. The method of claim 1 wherein the flat surface is a vertical wall substantially perpendicular to a floor beneath the engaged ball.

8. The method of claim 1 wherein the flat surface is a ceiling substantially parallel to a floor beneath the engaged ball.

9. The method of claim 1 wherein the flat surface is a slanted wall positioned at an angle between perpendicular and parallel to a floor beneath the engaged ball.

10. A method for mounting an engaged ball to a flat surface using an inelastic band, the method comprising:
    obtaining a ball with at least one seam running from a first pole to a second pole, the at least one seam defining a groove in the ball;
    identifying a portion of the flat surface to receive the engaged ball;
    engaging fasteners with the flat surface so that protruding fastener heads can be used to secure a wall mount component with an engaged ball to the flat surface;
    aligning the ball against the wall mount component;
    engaging the inelastic band with the wall mount component and placing the inelastic band around the ball, wherein the inelastic band is positioned within the groove in the ball to create the engaged ball;
    after engaging the inelastic band with the wall mount component and placing the inelastic band around the ball, at least partially inflating the engaged ball to expand the engaged ball towards regulation size for that type of ball; and
    engaging the wall mount component and the engaged-ball to protruding fastener heads; and further comprising:
    compressing a lace engagement component and engaging at least one distal end of the lace engagement component with at least one of a set of latitudinal laces in a manner that will require subsequent compression of the lace engagement component to release the engagement between the lace engagement component and the at least one of the set of latitudinal laces; and
    engaging a wall mount engagement portion of the lace engagement component with the wall mount component.

11. The method of claim 10 wherein the flat surface is a vertical wall substantially perpendicular to a floor beneath the engaged ball.

12. The method of claim 10 wherein the flat surface is a ceiling substantially parallel to a floor beneath the engaged ball.

13. The method of claim 10 wherein the flat surface is a slanted wall positioned at an angle between perpendicular and parallel to a floor beneath the engaged ball.

14. The method of claim 10 wherein the ball is mounted on the flat surface with the first pole located below the second pole.

15. The method of claim 14 wherein an absolute value of an angle for a deviation of the first pole and second pole relative to horizontal exceeds 10 degrees.

16. The method of claim 14 wherein the first pole and the second pole are in a vertical relationship.

\* \* \* \* \*